Patented Mar. 19, 1946

2,396,646

UNITED STATES PATENT OFFICE 2,396,646

ART OF PREPARATION OF VALUABLE SUBSTANCES FROM TALL OIL

Russell G. Dressler, Middle River, Md., Robert E. Vivian, Los Angeles, Calif., and Torsten Hasselstrom, Savannah, Ga.

No Drawing. Application March 11, 1940,
Serial No. 323,478

8 Claims. (Cl. 260—97.5)

This invention pertains to the art of preparation of valuable substances from tall oil.

Crude tall oil is a by- or waste-product of the sulfate or soda processes of the pulp and paper industry. In general, the term is associated with the sulfate process.

Tall oil is a complex material, the chemical composition of which is little known. It contains unsaturated fatty acids in simple or polymerized form, liquid and solid resin acids including some identifiable individuals as well as others virtually unknown as to structure, and unsaponifiable matter containing sterols. Any attempted quantitative analysis of the three mentioned principal constitutent bodies of tall oil results only in an arbitrary classification. It has been shown that tall oil is a material which is specific in its character and chemical properties, and can not be duplicated by a simple blending of ingredients.

Samples of tall oil vary considerably in composition, with respect to content of resin acids, fatty acids, and unsaponifiable matters. A great factor in determining the ratio of components (resin acids: fatty acids: unsaponifiables) is the ratio of sap-wood to heart-wood, as employed in the pulp used in the paper making process, as the sap-wood leads to a tall oil having more fatty acids and unsaponifiables than is the case with heart-wood. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. Many constituents of tall oil are individually unstable in that they are susceptible to oxidation, etc., and the material is not directly employable for most normal uses of either resin acids or fatty acids. The present procedure has been found advantageous in obtaining stable materials from tall oil in the crude, semi-refined and refined states. By way of illustration, a crude tall oil may contain 52 percent resin acids, 35.7 percent fatty acids, 8.3 percent unsaponifiable matter, iodine number 166 (modified Wijs), thiocyanogen number 74.4, acid number 154, melting point 20 degrees C., sulfur content .08 percent; while a refined and bleached (distilled) tall oil may comprise 38.5 percent resin acids, 51 percent fatty acids, 4.6 percent unsaponifiable matter, iodine number 161, thiocyanogen number 64, acid number 164, melting point 19 degrees C., sulfur content .06 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

According to this invention, tall oil is subjected to esterification, and then to a separation treatment involving saponification and selective dissolution of the products in water and in a solvent of fatty acid ester which itself is not soluble in water. Upon layer formation, a resin acid fraction is obtained in water solution as a salt which may be heated directly or after acidification to obtain a stable resin product in which unstable abietic-type resin acids of the general formula $C_{20}H_{30}O_2$ have at least in part been converted to dehydroabietic acid ($C_{20}H_{28}O_2$) and dihydroabietic acid ($C_{20}H_{32}O_2$). Likewise, a benzol fraction is obtained which contains substantially all of the fatty acids of the tall oil in the form of esters, along with traces of resin acid salts and traces of phenols: the solutes of this fraction may then be hydrogenated either after conversion to free acid, but preferably in the form of the esters, to yield a fatty product which is of great stability and of greatly benefited color and odor with respect to the original tall oil, and is capable of employments similar to those of oleic and stearic esters and acids now in commerce. It may be employed directly, or the esters may be hydrolyzed for liberating the corresponding fatty acid or a mixture of fatty acids, depending upon the degree of hydrogenation which has been accomplished: and may be converted to soaps and other products.

*Example I*

1000 grams of crude tall oil, having the composition as set forth illustratively above, was esterified. For this purpose, it was dissolved in an equal quantity of methanol and to the mixture was added about 50 cc. of concentrated sulfuric acid. The mixture was refluxed for about 20 to 30 minutes, and then about 2000 cc. of water and 1000 cc. of benzol added and the solution thoroughly mixed.

After settling, the lower aqueous layer was separated from the upper benzol layer: the aqueous layer contains sugars and water soluble ligneous matters (usually less than 5 percent), sulfuric acid from the treatment, and excess methanol. The benzol layer was shaken with a solution containing the theoretical amount of sodium hydroxide added in about ½ percent concentration. Caution is taken to keep the mixture slightly on the acid side in order to avoid formation of emulsions during the procedure of mixing. As all of the sulfuric acid is not separated with the said aqueous layer, the presence of this acid while adding the theoretical amount of sodium hydroxide normally suffices to maintain the necessary acidity. On standing, two layers are separated; the lower aqueous layer containing the sodium salts of the resin acid part of tall oil was separated from the upper layer which contains a benzol solution of the methyl esters of the fatty acids, and also the unsaponifiables, along with traces of resin acids and resinates. From the benzol solution, the benzol was stripped off completely or partially by means of distillation at atmospheric pressure or in vacuum. The residue containing tall oil esters (melting point about 13 degrees C. and iodine number 130) was heated for 2 hours at 150 degrees C. and at 150 pounds of hydrogen pressure. After this, the spent catalyst was filtered off and ½ of a percent of nickel catalyst added and hydrogenation continued for 3 hours at 200 pounds pressure. The resulting product was of very light color, melted at about 16 degrees C. and had an iodine number of about 62.

The lower (second) aqueous layer, which was separated, contained the sodium salts of the resin acid components of tall oil, and from which the resin acids may be separated in free state, if desired, by simple addition of a mineral acid. It contains the sodium soaps of resin acids, and usually also including a small quantity of fatty acid soaps and esters, and likewise contains phenols or phenolates and acids of lignoceric type, normally in the form of the alkali metal salts.

As pointed out above, tall oils vary in composition, particularly with respect to the resin acid: fatty acid ratio. It is obvious that the proportions of esterifying agent and of saponifying agent may properly be varied in accordance with this ratio in order to avoid wastage and the employment of excessive quantities of reactants.

*Example II*

The separated fatty esters and unsaponifiable material prepared as set out in Example I and after stripping the benzol, were subjected to fractional distillation in vacuum at 4 mm. pressure. 500 grams of crude tall oil yielded about 200 grams of methyl esters boiling at about 185–200 degrees C., and about 50 grams of residue. These esters were subjected to heat treatment with 1 percent of unsupported nickel catalyst and heated for 1 hour at 150 degrees C. at 100 pounds hydrogen pressure per square inch. Then 2 percent more of unsupported nickel catalyst was added and hydrogenation continued at 175 degrees C. at 1000 pounds pressure. The iodine number of this product was about 10, and its melting point was 36 degrees C.: it contained stearic acid methyl ester as the major constituent. It might be mentioned that the theoretical melting point of pure methyl stearate is about 39 degrees C.

*Example III*

The aqueous layer separated upon alkalizing the benzol extract was acidified with sulfuric acid and gave a tall oil resinous gum having an acid number of about 163.5, and was dark brown to black in color with the odor of mercaptans and fats and having the consistency of a paste. It contained about 70 to 85 percent of resin acids, primarily Steele's abietic acid, the remainder being essentially composed of acids of lignoceric type and of phenolic substances of unknown nature. 100 parts of this material was heated in the absence of hydrogen at 180 degrees C. for three hours together with 2 percent of nickel as a disproportionation catalyst; and then the liquid mixture was filtered free from spent catalyst. The resultant product was of pasty consistency, amber to dark brown in color and had an acid number of 132. When subjected to sulfonation, 26 percent of dehydroabietic acid sulfonate was obtained, indicating a similar proportion of dehydroabietic acid in the initial disproportionated product. It does not appreciably absorb oxygen when exposed to air, in contrast to the instability of tall oil resin gum under atmospheric conditions.

The acid number of the gums obtained by acidifying the aforesaid aqueous layer from various tall oils usually lies between 120 and 150. The disproportionating treatment can be effected at between 120 and 280 degrees C. in 1 to 5 hours time, with the employment of ½ to 5 percent of nickel catalyst: and it will be understood that longer times and greater quantities of catalyst are employed for the lower temperatures. The resultant products from the various specimens of tall oil contain from 15 to 35 percent of dehydroabietic acid under the treatment above.

Instead of nickel, it is feasible to employ other disproportionating catalysts such as copper, chromite, platinum, palladium, fuller's earth, bleaching clay, etc.

Further, it is possible to obtain a stabilized product without the initial acidification of the aqueous layer. For example, sodium resinate may be salted out from this aqueous layer and subjected to a heat treatment as above, preferably with the employment of one of the aforesaid catalysts for accelerating the disproportionation and the production of the dehydroabietic acid radical.

The product of such treatments of the aqueous layer may be employed as a detergent or emulsifying agent, as it is a stabilized mixture including the modified resin acids either as such or in the form of the alkali metal salts. It likewise usually includes a small quantity of fatty acid soaps and esters, and contains phenols or phenolates which are effective as penetrating agents and antiseptics. Furthermore, these materials as prepared, contain acids of lignoceric type, normally in the form of the alkali metal salts, which likewise are of assistance in the action of the detergent material. The product has an acid number dependent upon the tall oil employed and also upon the benzol or like selected solvents employed in the purification. The proportion of dehydroabietic acid present is likewise dependent upon the tall oil employed as a source, and upon the length and conditions of tall oil for disproportionation: conversely, the quantity of Steele's abietic acid decreases as the proportion of dehydroabietic acid increases, and for a stabilized composition, the proportion of Steele's abietic acid should be less than 30 percent, and it is normally preferred to have it less than 10 percent.

*Example IV*

200 grams of a typical crude tall oil were mixed with 20 grams of an active bleaching clay such as is used for vegetable oils. This mixture was heated to and maintained at 120 to 130 degrees C., and agitated by rocking for a period of fifteen minutes, while a non-oxidizing atmosphere (hydrogen) was maintained in contact therewith. The tall oil was filtered free from the clay and the material adsorbed therein, and was found to be substantially unchanged in color. This pretreated tall oil was then esterified in the manner described for Example I above, and the selective separation effected by benzol, followed by alkalization of the benzol layer and a further separation. The solutes of the benzol solution were then treated with hydrogen under pressure and at an elevated temperature in the presence of nickel catalyst. Hydrogenation was effected for four hours at 200 pounds pressure per square inch, employing one-half percent of fresh nickel catalyst. The product had an iodine number of 70 and a melting point of about 15 degrees C.: it contained methyl ester of stearic acid and also methyl ester of oleic acid, having the characteristic odor of such methyl esters and being of a light color.

Likewise, the aqueous layer containing alkali metal resinates may be treated as set out above to effect a disproportionation and therewith a stabilization of the resin acid components of the original tall oil.

As set out in our copending application, Serial No. 312,158, filed Jan. 2, 1940, it is likewise possible to effect a pre-treatment of the tall oil while in dissolved form in cleaner's naphtha or like solvent: and other materials such as bleaching earth, spent or unspent hydrogenation catalyst, active carbons, and like adsorbent substances may be employed for effecting this pre-treatment, which serves to eliminate at least in part the catalyst poisons present in the original tall oil.

The hydrogenation of the methyl esters of tall oil fatty acid may be accomplished under other conditions than those set out above. A hydrogenation for six hours with one percent of nickel catalyst at 180 degrees C. and 175 pounds pressure gave a final product melting at 16 degrees C., with an iodine number of 82. Hydrogenation with 2 percent of nickel catalyst for three hours at 180 degrees C. and 175 pounds pressure gave a final product with a melting point of 26 degrees C. and an iodine number of 55. Hydrogenation with two percent of nickel catalyst for five hours at 180 degrees C. and 265 pounds pressure gave a product melting at 29 degrees C. and an iodine number of 41.

While reference in the specific examples has been made to the treatment of crude tall oil, as indicating the far-reaching nature of purification effected, similar procedures are obviously capable of producing corresponding results with semi-refined and refined tall oils such as "distilled tall oil" of commerce.

Ethyl and similar esters may be prepared, separated and purified in like ways; but the methyl and ethyl esters are preferred, as a better separation occurs with them.

Likewise, other organic solvents of fatty acid esters may be employed for the separation. Thus toluol, xylol, naphtha, and other like solvents may be used which are capable of dissolving the fatty acid esters, and are not themselves soluble in water and do not have a preferential solubility for the alkali metal salts of resin acids as compared with the solubility thereof in water.

The hydrogenation of the fatty acid esters is preferably effected under increased pressure, usually of the order of 200 to 600 pounds per square inch, in order to obtain a rapid addition and to avoid any discoloration by action of catalyst.

It is obvious that the invention is not limited to the specific illustrative examples, but that it may be practiced in many ways within the scope of the appended claims.

We claim:

1. The process of separating fatty and resin acid constituents of tall oil, which comprises esterifying fatty acids of the tall oil in the presence of a mineral acid, mixing the treated tall oil with an organic solvent which itself is insoluble in water, separating aqueous and organic layers, treating the material of the organic layer with water and alkali to effect conversion of the resin acids to resinates while maintaining an acid condition, and effecting settling to form an aqueous layer containing alkali resinates and an organic solvent layer containing fatty acid ester.

2. The process of separating fatty and resin acid constituents of tall oil, which comprises dissolving tall oil in an alcohol and effecting esterification of fatty acids with the alcohol in the presence of a mineral acid, mixing the treated tall oil with an organic solvent which itself is insoluble in water whereby aqueous and organic layers may be formed, separating aqueous and organic layers, treating the material of the organic layer with water and alkali to effect conversion of the resin acids to resinates while maintaining an acid condition, and effecting settling to form an aqueous layer containing alkali resinates and an organic solvent layer containing fatty acid ester.

3. The process of separating fatty and resin acid constituents of tall oil, which comprises dissolving tall oil in methanol, adding a mineral acid and warming to effect esterification of fatty acids with the methanol, mixing the treated tall oil with a water-insoluble aromatic hydrocarbon solvent which itself is insoluble in water whereby aqueous and organic layers may be formed, separating aqueous and organic layers, treating the material of the hydrocarbon solvent layer with water and alkali to effect conversion of the resin acids to resinates while maintaining an acid condition, and effecting settling to form an aqueous layer containing alkali resinates and a hydrocarbon solvent layer containing fatty acid ester.

4. The process of preparing a fatty acid compound from tall oil, which comprises esterifying fatty acids of the tall oil in the presence of a mineral acid, mixing the treated tall oil with an organic solvent which itself is lighter than and insoluble in water, effecting a first settling to form a lower aqueous layer and an upper organic layer, treating the material of the upper layer with water and alkali to effect conversion of the resin acids to resinates while maintaining an acid condition, effecting a second settling and separating an aqueous layer from an organic solvent layer, and recovering the fatty acid compound from the latter organic solvent layer.

5. The process of preparing a fatty acid compound from tall oil, which comprises dissolving tall oil in an alcohol and effecting esterification of fatty acids with the alcohol in the presence of a mineral acid, mixing the treated tall oil with an organic solvent which itself is lighter than and insoluble in water, effecting a first settling to form a lower aqueous layer and an upper organic layer, treating the material of the organic layer with an aqueous alkali solution to effect conversion of the resin acids to resinates while maintaining an acid condition, effecting a second settling and separating an aqueous layer from an organic solvent layer, and recovering the fatty acid compound from the latter organic solvent layer.

6. The process of preparing a resin acid compound from tall oil, which comprises esterifying fatty acids of the tall oil in the presence of a mineral acid, mixing the treated tall oil with an organic solvent which itself is lighter than and insoluble in water, effecting a first settling and separating a lower aqueous layer and an upper organic layer, treating the material of the organic layer with aqueous alkali solution to effect conversion of the resin acids to resinates while maintaining an acid condition, effecting a second settling and separating an aqueous layer from an organic solvent layer, and recovering the resin acid compound from the latter aqueous layer.

7. The process of preparing a resin acid compound from tall oil, which comprises dissolving tall oil in an alcohol and effecting esterification of fatty acids with the alcohol in the presence of a mineral acid, mixing the treated tall oil with an organic solvent which itself is insoluble in water, effecting a first settling and separating aqueous and organic layers, treating the material of the organic layer with an aqueous alkali solution to effect conversion of the resin acids to resinates while maintaining an acid condition, effecting a second settling and separating an aqueous layer from an organic solvent layer, and recovering the resin acid compound from the latter aqueous layer.

8. The process of preparing a resin acid compound from tall oil, which comprises dissolving tall oil in an alcohol, adding mineral acid and effecting esterification of fatty acids of the tall oil with the alcohol, mixing the treated tall oil with an organic solvent which itself is insoluble in water, effecting a first settling and separating aqueous and organic layers, treating the material of the organic layer with an aqueous alkali solution to effect conversion of the resin acids to resinates while maintaining an acid condition, effecting a second settling and separating an aqueous layer from an organic solvent layer, and recovering the resin acid compound from the latter aqueous layer.

RUSSELL G. DRESSLER.
ROBERT E. VIVIAN.
TORSTEN HASSELSTROM.